(12) United States Patent
Kim

(10) Patent No.: US 10,077,534 B2
(45) Date of Patent: Sep. 18, 2018

(54) ASPHALT REINFORCEMENT MEMBER COMPRISING AIR-PERMEABLE POLYETHYLENE FILM

(71) Applicant: ESG INDUSTRY CO., LTD., Daejeon (KR)

(72) Inventor: Hyeong Su Kim, Daejeon (KR)

(73) Assignee: ESG INDUSTRY CO., LTD., Daejeon (KR)

( * ) Notice: Subject to any disclaimer, the term of this patent is extended or adjusted under 35 U.S.C. 154(b) by 0 days.

(21) Appl. No.: 15/107,582

(22) PCT Filed: Oct. 13, 2014

(86) PCT No.: PCT/KR2014/009587
§ 371 (c)(1),
(2) Date: Jun. 23, 2016

(87) PCT Pub. No.: WO2015/133696
PCT Pub. Date: Sep. 11, 2015

(65) Prior Publication Data
US 2016/0362849 A1    Dec. 15, 2016

(30) Foreign Application Priority Data

Mar. 4, 2014    (KR) .......................... 10-2014-0025622

(51) Int. Cl.
*E01C 11/16*    (2006.01)
*B32B 27/20*    (2006.01)
(Continued)

(52) U.S. Cl.
CPC ............ *E01C 11/165* (2013.01); *B32B 5/028* (2013.01); *B32B 7/12* (2013.01); *B32B 11/10* (2013.01);
(Continued)

(58) Field of Classification Search
CPC . E01C 7/325; E01C 7/30; E01C 11/16; C01C 11/16; C01C 11/165;
(Continued)

(56) References Cited

U.S. PATENT DOCUMENTS

2006/0154546 A1* 7/2006 Murphy ................ A61F 13/023
442/286
2007/0178784 A1* 8/2007 Jones ...................... B32B 27/12
442/41
(Continued)

FOREIGN PATENT DOCUMENTS

EP    1 051 296    1/2004
JP    10-292059    11/1998
(Continued)

OTHER PUBLICATIONS

International Search Report for PCT/KR2014/009587, dated Jan. 13, 2015, 4 pages.
(Continued)

*Primary Examiner* — Camie S Thompson
(74) *Attorney, Agent, or Firm* — Nixon & Vanderhye P.C.

(57) ABSTRACT

The present invention relates to an asphalt reinforcement comprising an air-permeable polyethylene film, and more particularly, to an asphalt reinforcement comprising an air-permeable polyethylene film prepared by adding an inorganic material to a composition comprising polyethylenes having different properties. The asphalt reinforcement comprising the air-permeable polyethylene film according to the present invention has excellent adhesive strength, constructability, flexibility and mechanical strength.

8 Claims, 5 Drawing Sheets

(51) Int. Cl.
  *B32B 27/12* (2006.01)
  *E01C 7/32* (2006.01)
  *E01C 7/30* (2006.01)
  *B32B 27/18* (2006.01)
  *B32B 27/32* (2006.01)
  *C08J 9/00* (2006.01)
  *B32B 7/12* (2006.01)
  *B32B 11/10* (2006.01)
  *C08L 23/08* (2006.01)
  *B32B 5/02* (2006.01)

(52) U.S. Cl.
  CPC .............. *B32B 27/12* (2013.01); *B32B 27/18* (2013.01); *B32B 27/20* (2013.01); *B32B 27/32* (2013.01); *C08J 9/00* (2013.01); *C08L 23/0815* (2013.01); *E01C 7/30* (2013.01); *E01C 7/325* (2013.01); *E01C 11/16* (2013.01); *B32B 2264/10* (2013.01); *B32B 2307/54* (2013.01); *B32B 2307/71* (2013.01); *B32B 2307/72* (2013.01); *B32B 2307/724* (2013.01); *B32B 2307/746* (2013.01)

(58) Field of Classification Search
  CPC ...... C08L 23/0185; C08L 23/04; C08L 23/06; C08L 23/0815; B32B 5/028; B32B 2307/724; B32B 2307/72; B32B 2307/746; B32B 27/12; B32B 27/18; B32B 27/20; B32B 27/32; B32B 7/12; B32B 11/10; B32B 2301/72; B32B 2301/724

See application file for complete search history.

(56) References Cited

U.S. PATENT DOCUMENTS

2009/0098330 A1\* 4/2009 Lee ................. E01C 11/165
                                                              428/109
2012/0094067 A1    4/2012 Nakae et al.

FOREIGN PATENT DOCUMENTS

| JP | 2001-151917 |   | 5/2001 |
| JP | 2002249622 | \* | 9/2002 |
| JP | 2010-184451 |   | 8/2010 |
| KR | 10-465176 |   | 5/2005 |
| KR | 10-2005-0102469 |   | 10/2005 |
| KR | 100773735 | \* | 11/2007 |
| KR | 10-0801552 |   | 2/2008 |
| KR | 10-1203935 |   | 11/2012 |

OTHER PUBLICATIONS

Written Opinion (foreign language) for PCT/KR2014/009587, dated Jan. 13, 2015, 3 pages.

\* cited by examiner

[fig. 1]
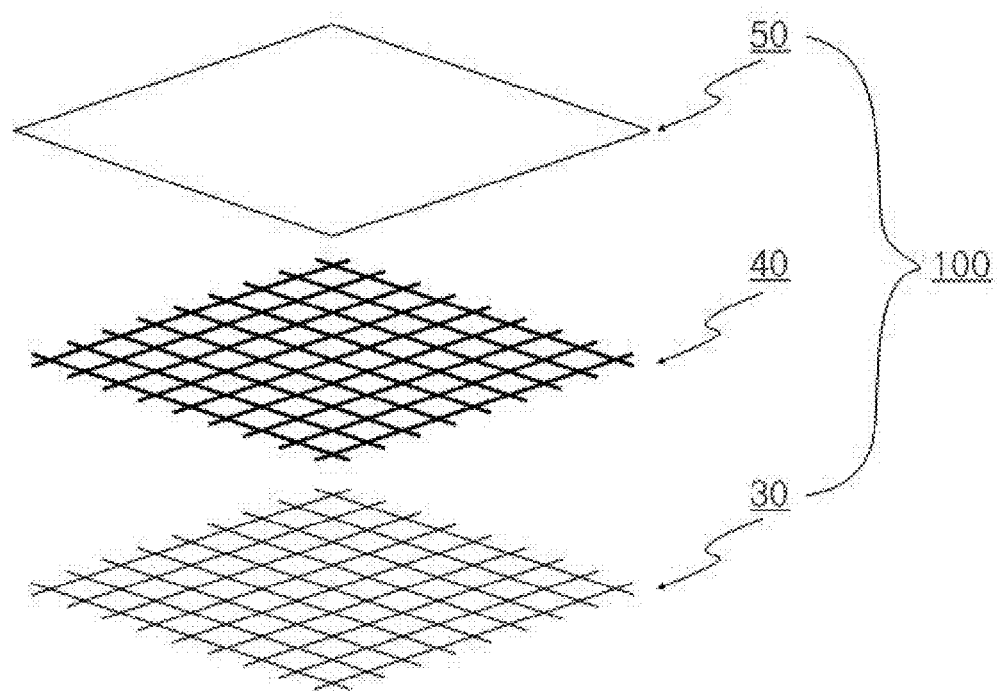

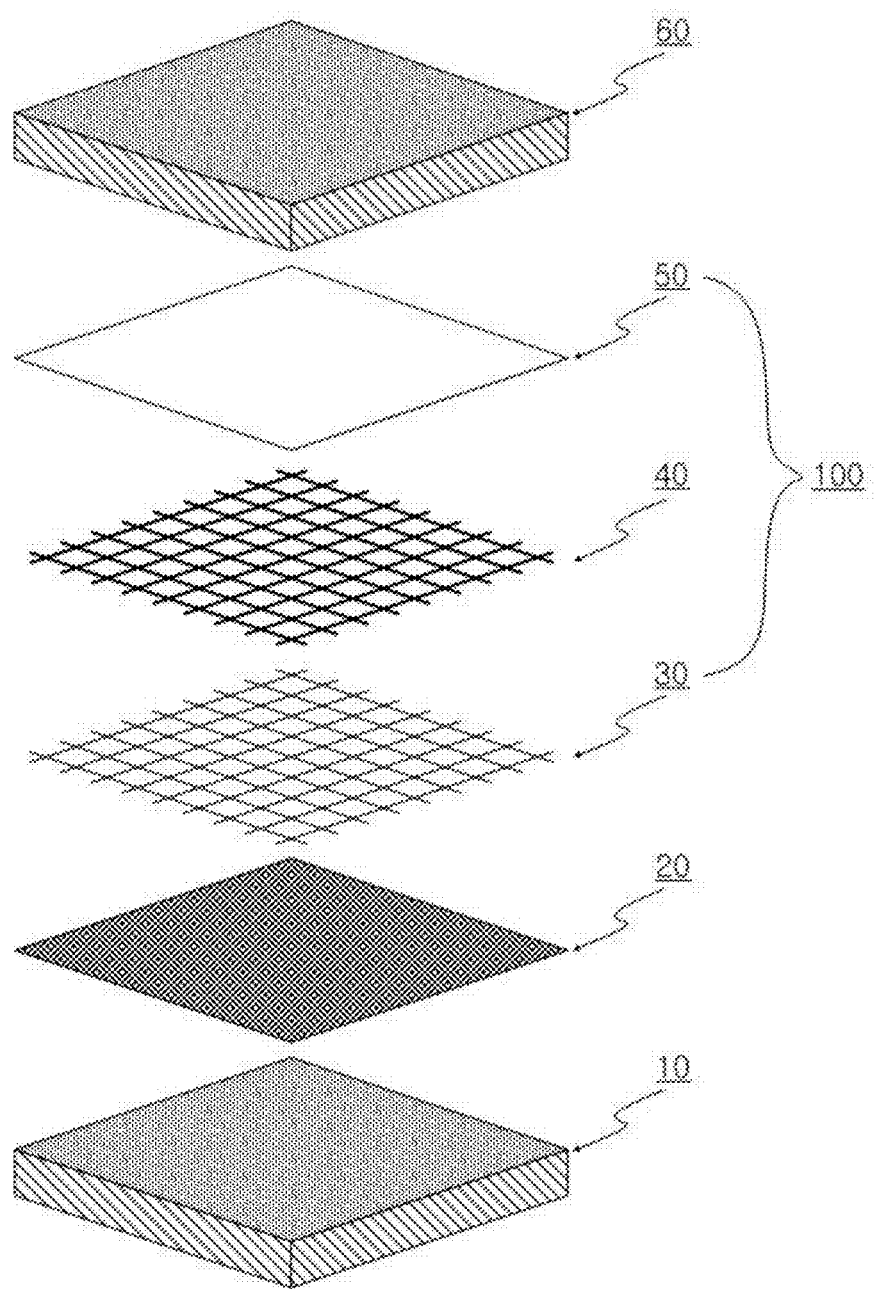

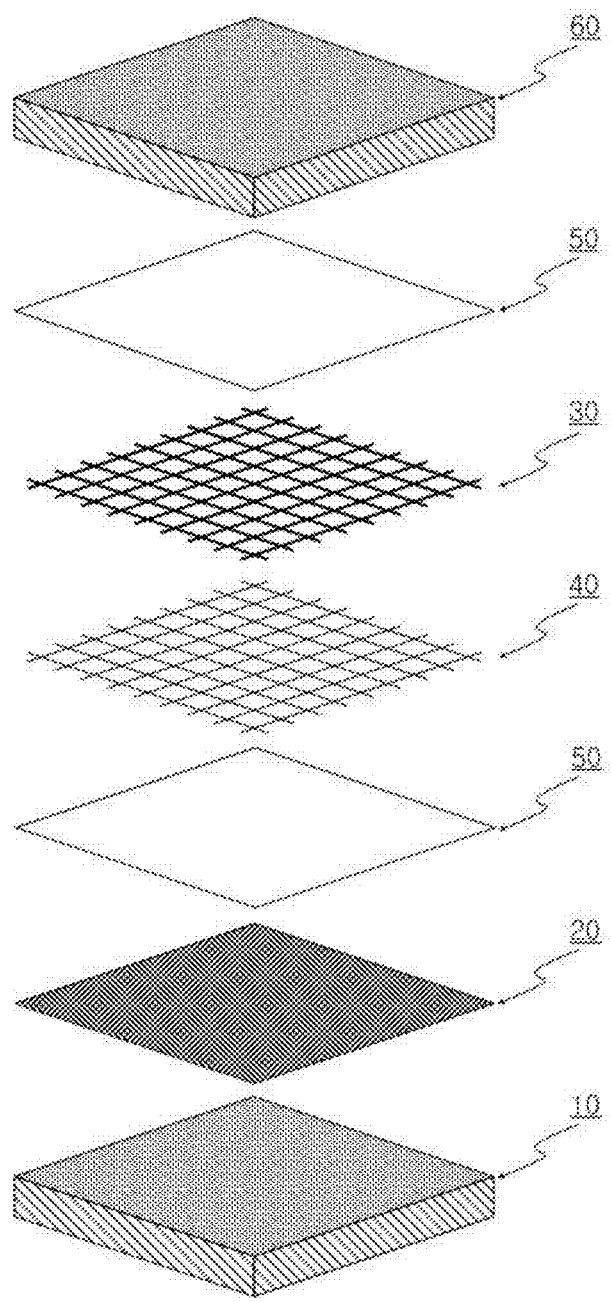

[fig. 4]
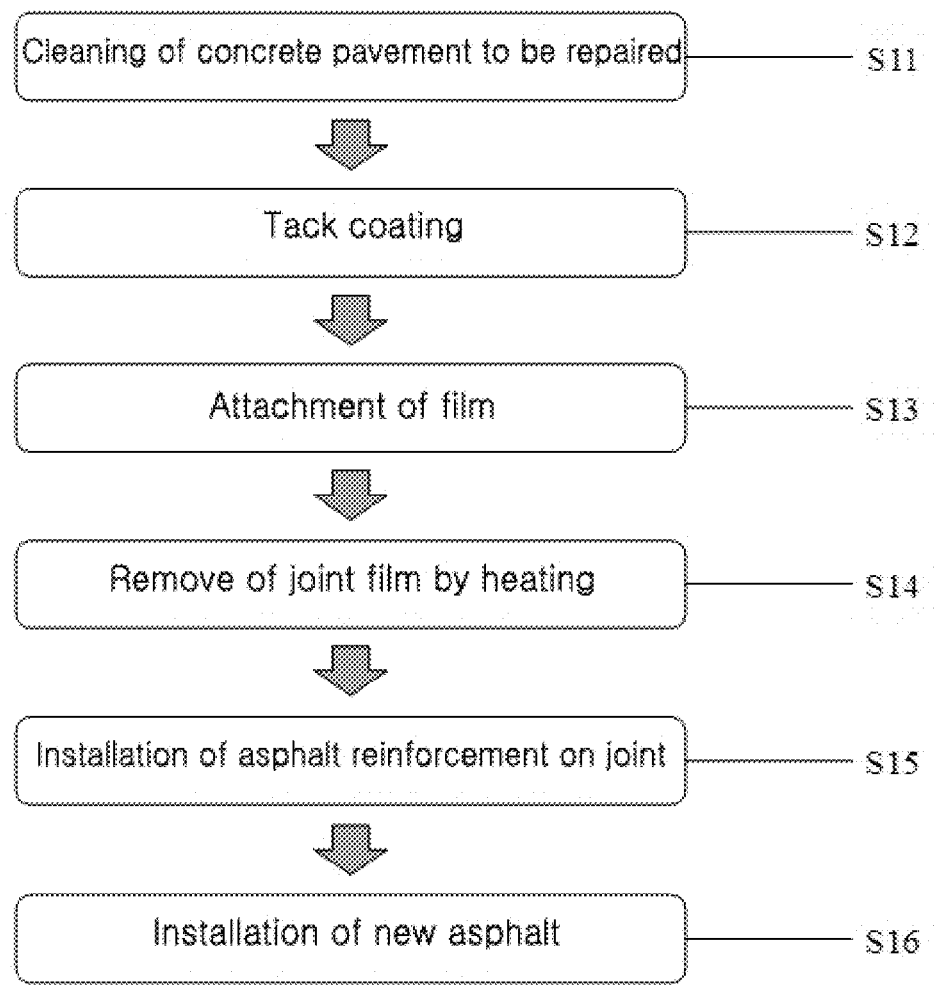

[fig. 5]
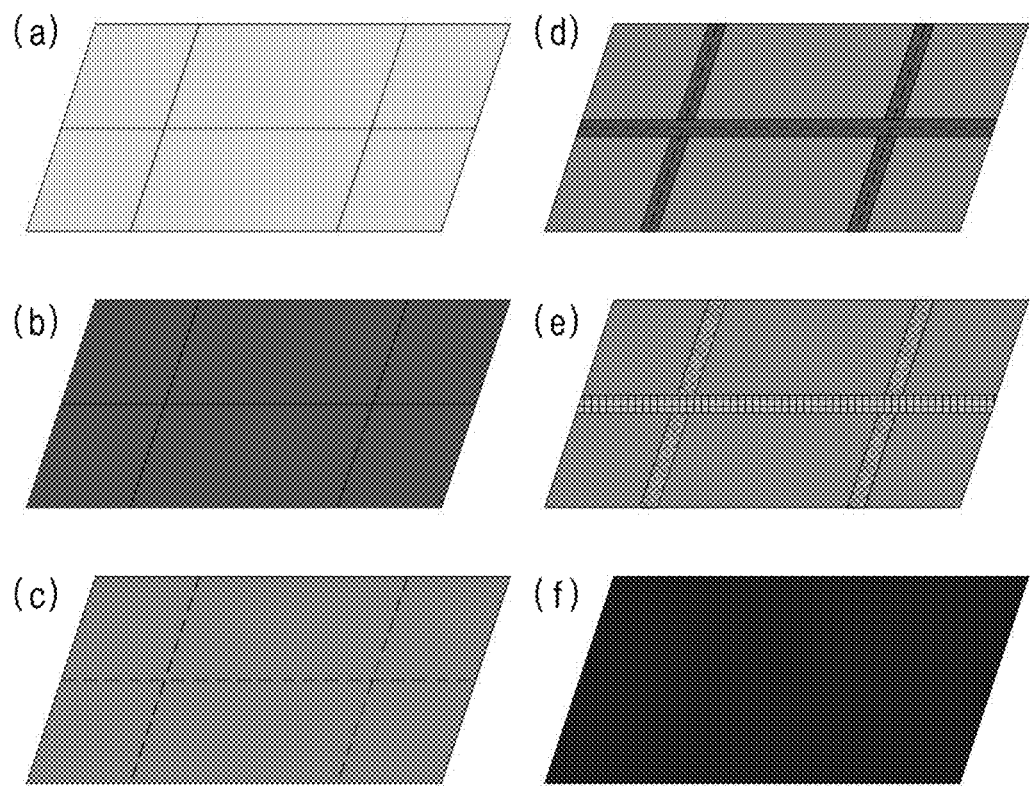

ASPHALT REINFORCEMENT MEMBER COMPRISING AIR-PERMEABLE POLYETHYLENE FILM

This application is the U.S. national phase of International Application No. PCT/KR2014/009587 filed 13 Oct. 2014, which designated the U.S. and claims priority to KR Patent Application No. 10-2014-0025622 filed 4 Mar. 2014, the entire contents of each of which are hereby incorporated by reference.

TECHNICAL FIELD

The present invention relates to an asphalt reinforcement, and more particularly, to an asphalt reinforcement comprising an air-permeable polyethylene film.

BACKGROUND ART

Generally, concrete or asphalt pavement is mainly used for road pavement. In particular, concrete pavement is frequently used because of its good flexibility for heavy vehicles and its long service life, even though the concrete curing time is long and a process such as joint installation is complicated. However, in the case of concrete pavement, the maintenance and repair of the joint are required, the times for the maintenance and repair are long, and the costs for the maintenance and repair are also high. In addition, concrete pavement is hardly applied to urban roads with much traffic, due to problems such as noise, and poor riding comfort caused by the joint, and the use of concrete pavement in highways is also gradually decreasing.

In comparison with this, asphalt pavement has disadvantages in that it has low flexibility for heavy vehicles, requires frequent repair due to its relatively short service life resulting from frequent occurrence of plastic deformation, cracks, potholes and the like, and causes obstruction in traffic flow. However, asphalt pavement is used in many applications, including urban roads, because it is constructed quickly and simply, and the costs for the maintenance and repair costs thereof are low.

Such asphalt pavement has problems due to the following causes during and after construction. During construction, it has problems due to typical causes, including poor temperature control during paving of asphalt mixtures, the amount of tack coat, poor application of tack coats, and poor compaction of asphalt mixtures. After construction, it has problems due to causes, including long-term use, traffic loads, ground behavior, freezing, thawing, and entry of chlorides used to eliminate freezing.

In particular, the importance of tack coating has recently attracted attention. The poor adhesion between pavement layers due to poor tack coating causes shoving, separation between new and old pavement layers, premature fatigue cracking, plastic deformation, and broken parts such as potholes, resulting in a decrease in the service life of pavement. In addition, regarding the failure mechanism of asphalt overlay pavement structures, it was reported that, when horizontal shear stress and vertical tension stress occur at the interface between pavement layers due to vehicle loads so that the load exceeds the maximum adhesive strength, pavement deterioration occurs.

In addition, when asphalt overlay is performed for maintenance and repair, reflection cracking frequently occurs. To solve this problem, a process of installing reinforcements fiber comprising carbon fiber, glass fiber, aramid fiber, polyester fiber or the like for the purpose of preventing the cracking and plastic deformation of asphalt pavement is mainly applied. Because the reinforcement fibers have both elasticity and ductility, they function to extend the service life of asphalt when they are applied to asphalt construction.

However, because conventional reinforcements are impregnated with an asphalt emulsion, they are highly sticky. Thus, when these reinforcements are stored in a rolled state, the inner and outer surfaces thereof adhere to each other, making the use thereof difficult. In addition, when a reinforcement is installed on an existing asphalt substrate or when asphalt is paved on a road having a reinforcement installed thereon, the reinforcement sticks to the wheels of equipment such as dump trucks, finishers or construction equipment or enter the equipment to cause problems in the equipment, or greatly reduce workability.

For this reason, a technology of applying to one side of reinforcements a film that increases the efficiency of work and facilitates a reinforcement unrolling process has been developed. Korean Utility Model publication No. 20-0375633 discloses a technology that uses a polypropylene film as a grid-type reinforcement impregnated with asphalt.

DISCLOSURE

Technical Problem

Accordingly, the present invention has been made in order to solve the problems occurring in the use of the above-described polypropylene film, and it is an object of the present invention to prepare a polyethylene film by adding an inorganic material to a polyethylene composition and to apply an asphalt reinforcement comprising the polyethylene film to asphalt pavement construction. When the asphalt reinforcement comprising the film prepared by adding the inorganic material to the polyethylene composition is used, it will have air permeability that facilitates the discharge of water or steam from emulsified asphalt (that is a tack coat material) to curing of the emulsified asphalt possible, thereby protecting the tack coat to thereby ensure the adhesion between an asphalt substrate and a newly installed asphalt pavement. In addition, the reinforcement fiber layer having the air-permeable polyethylene film attached thereto may function to ensure adhesion and also to prevent cracking, plastic deformation, pothole formation, etc.

Technical Solution

The present invention relates to an asphalt reinforcement comprising: a reinforcement fiber layer having a plurality of holes formed therein; and an air-permeable polyethylene film layer disposed on the top surface, bottom surface, or both, of the reinforcement fiber layer, wherein the air-permeable polyethylene film layer is prepared from a polyethylene composition comprising, based on the total weight of the air-permeable polyethylene film layer, 4-20 wt % of low-density polyethylene, 10-45 wt % of linear low-density polyethylene, 1-25 wt % of high-density polyethylene, and 30-70 wt % of an inorganic material, and the air permeability in the thickness direction of the air-permeable polyethylene film is 1,100 g/m²·day to 5,000 g/m²·day.

Preferably, the reinforcement fiber layer and the film layer in the asphalt reinforcement may be integrated with each other by heating the reinforcement fiber layer or the film layer.

Preferably, the asphalt reinforcement may further comprise an adhesive layer between the reinforcement fiber layer and the film layer.

Preferably, the low-density polyethylene of the air-permeable polyethylene film layer has a melt index of 0.1-10.0 g/10 min (190° C., 2.16 kg) and a density of 0.910-0.930 g/cm$^3$, and the linear low-density polyethylene has a melt index of 1.0-7.0 g/10 min (190° C., 2.16 kg) and a density of 0.915-0.940 g/cm$^3$, and the high-density polyethylene has a melt index of 1.0-10.0 g/10 min (190° C., 2.16 kg) and a density of 0.940-0.965 g/cm$^3$.

Preferably, the inorganic material of the air-permeable polyethylene layer may be one or more selected from the group consisting of calcium carbonate, magnesium carbonate, magnesium sulfate, barium sulfate, magnesium sulfate, talc, kaolin, zinc oxide, titanium dioxide, alumina, aluminum hydroxide, magnesium hydroxide, zeolite, diatomaceous earth, and clay, and the inorganic material may have an average particle size of 1.1-4.0 μm.

Preferably, the air-permeable polyethylene film layer may further comprise one or more additives selected from the group consisting of an antioxidant agent, an anti-blocking agent, a UV stabilizer and a slip agent.

Preferably, the air-permeable polyethylene film layer may have irregularities on one or both surfaces thereof.

Preferably, the air-permeable polyethylene film layer may have an average weight of 9-150 g/m$^2$.

Advantageous Effects

When the asphalt reinforcement comprising the polyethylene film having the inorganic material added thereto according to the present invention is used, it will have air permeability that facilitates the discharge of water or steam from emulsified asphalt (that is a tack coat material) to curing of the emulsified asphalt possible, thereby protecting the tack coat to thereby ensure the adhesion between an asphalt substrate and a newly installed asphalt pavement. Furthermore, it has a low melting point, and thus can be easily melted by newly installed asphalt, indicating that it is easily applied. Furthermore, it has high mechanical strength and flexibility, and can provide a reinforcement fiber layer that prevents cracking, plastic deformation, pothole formation and the like, which are the problems of asphalt pavement.

DESCRIPTION OF DRAWINGS

FIG. 1 is an exploded perspective view showing an asphalt reinforcement comprising an air-permeable polyethylene film according to the present invention.

FIG. 2 is an exploded perspective view showing a state in which an asphalt reinforcement comprising an air-permeable polyethylene film according to the present invention is attached to an asphalt or concrete substrate.

FIG. 3 is an exploded perspective view showing in a state in which an air-permeable polyethylene film is attached to the top surface of a tack coat and the top surface of an asphalt reinforcement.

FIG. 4 is a flow chart showing a process of repairing a concrete joint using an air-permeable polyethylene film.

FIG. 5 is a process diagram showing a process of repairing a concrete joint using an air-permeable polyethylene film.

MODE FOR INVENTION

All technical terms used in the present invention have the following definitions unless indicated otherwise and have the same meanings as those that are generally understood by those skilled in the art to which the present invention pertains. In addition, although a preferred method or sample is described in the specification, those similar or equivalent thereto also fall within the scope of the present invention.

The present invention relates to an asphalt reinforcement comprising an air-permeable polyethylene film, and more particularly, to an asphalt reinforcement comprising: a reinforcement fiber layer having a plurality of holes formed therein; and an air-permeable polyethylene film layer disposed on the top surface, bottom surface, or both, of the reinforcement fiber layer.

The air-permeable polyethylene film that is used in the present invention comprises, based on the total weight of the air-permeable polyethylene film, 4-20 wt % of low-density polyethylene, 10-45 wt % of linear low-density polyethylene, 1-25 wt % of high-density polyethylene, and 30-70 wt % of an inorganic material, and the air permeability in the thickness direction of the air-permeable polyethylene film is 1,100 g/m$^2$·day to 5,000 g/m$^2$·day.

In the present invention, the low-density polyethylene may be used in an amount of 4-20 wt % based on the total weight of the air-permeable polyethylene film, and preferably has a melt index of 0.1-10.0 g/10 min and a density of 0.910-0.930 g/cm$^3$. If the low-density polyethylene is used in an amount of less than 4 wt %, the processability of the film will making it difficult to achieve uniform production and quality, and if low-density polyethylene is used in an amount of more than 20 wt %, the film will show low mechanical strength when applied.

In the present invention, the linear low-density polyethylene may be used in an amount of 10-45 wt % based on the total weight of the air-permeable polyethylene film, and preferably has a melt index of 1.0-7.0 g/10 min and a density of 0.915-0.940 g/cm$^3$. This linear low-density polyethylene is used to prepare a film that has stable mechanical properties and that does not substantially change its properties by external factors. If the linear low-density polyethylene is used in an amount of less than 10 wt %, it will be difficult to achieve stable properties, and if the linear low-density polyethylene is used in an amount of more than 45 wt %, the neck-in properties of the prepared film will be reduced, and a uniform film cannot be produced, resulting in a decrease in the film productivity and quality. The linear low-density polyethylene that is used in the present invention may be non-metallocene-based polyethylene, metallocene-based polyethylene, or a mixture thereof.

In the present invention, the high-density polyethylene may be used in an amount of 1-25 wt % based on the total weight of the air-permeable polyethylene film, and preferably has a melt index of 1.0-10.0 g/10 min and a density of about 0.940-0.965 g/cm$^3$, in view of processability and physical properties of the film. The high-density polyethylene is used to achieve a high mechanical strength that is difficult to achieve by the linear low-density polyethylene alone, but if the high-density polyethylene is used in an amount of more than 25 wt %, the film will be hard and will have low flexibility, and scratches will be highly likely to occur on the film, resulting in cracks.

In the present invention, the inorganic material is preferably used in an amount of 30-70 wt % based on the total weight of the air-permeable polyethylene film. In an embodiment of the present invention, the inorganic material has an average particle size of 1.1-4.0 μm, preferably 1.5-3.0 μm, and in this case, the film has excellent physical properties without losing its properties. The inorganic material functions to form pores to impart air permeability, and may be selected from among calcium carbonate, magnesium carbonate, magnesium sulfate, barium sulfate, magnesium sulfate, talc, kaolin, zinc oxide, titanium dioxide, alumina, aluminum hydroxide, magnesium hydroxide, zeolite, diatomaceous earth, clay, and the like. If the average particle size of the inorganic material is less than 1.1 µm, good air permeability cannot be obtained, and an overload can be applied to an extrusion system during production to reduce the life span of the system. Meanwhile, if the average particle size of the inorganic material is more than 4.0 µm, deterioration in quality, such as tearing, hole formation or a decrease in strength, can occur during film preparation.

In addition, in the present invention, a color may be imparted to the film in order to facilitate discrimination. To impart a color to the film, a color master batch may be used in an amount of less than or equal to 20 wt % based on the total weight of the air-permeable polyethylene film. In addition, a color may be imparted to the film by use of at least one printing method selected from the group consisting of gravure printing, flexographic printing, offset printing, and laser printing.

In addition, the air-permeable polyethylene film that is used in the present invention may further comprise one or more additives selected from the group consisting of an antioxidant agent, an anti-blocking agent, a UV stabilizer, and a slip agent.

Hereinafter, a method for preparing a polyethylene film that is used in the present invention will be described in detail. All the components of the composition may be mixed with one another in a mixer such as a Henschel mixer, or may be melt-compounded in an extruder, and then pelletized. The resulting mixture is melted using a blown film extruder or a T-die film extruder to form a film. The film prepared as described above may be blown-drawn by air expansion or may be mechanically drawn in a uniaxial or biaxial direction by the rotation ratio of continuous rollers. In the present invention, a mixture, obtained by melting in an extruder and pelletizing, was used, and the mixture was melted using a T-die film extruder to form a film which was then biaxially drawn at a draw ratio of 2.0-3.0.

The average weight of the protective film for the asphalt reinforcement according to the present invention may be suitable selected according to circumstances without limitation. The average weight is preferably 9-150 gsm (g/m$^2$), more preferably 10-100 gsm (g/m$^2$).

One or both surfaces of the protective film may be surface-treated by an oxidation method or an irregularity forming method for the purpose of enhancing the adhesion to a layer that is formed thereon. Although the oxidation method or the irregularity forming method is not limited to a specific method, the oxidation method is preferably a corona discharge treatment method in terms of effects and operability. In addition, as the irregularity forming method, a press method may be used to form irregularities having various patterns. This is effective in increasing the average weight uniformity of the air-permeable polyethylene film.

FIG. 1 is an exploded perspective view of an asphalt reinforcement comprising an air-permeable polyethylene film according to the present invention, and FIG. 2 is an exploded perspective view showing a state in which an asphalt reinforcement comprising an air-permeable polyethylene film according to the present invention is attached to an asphalt, concrete or steel substrate.

As shown in FIG. 1, an asphalt reinforcement comprising an air-permeable polyethylene film according to an embodiment of the present invention may comprise: a reinforcement fiber layer having a plurality of holes formed therein; an adhesive layer formed on the reinforcement fiber layer; and an air-permeable polyethylene film layer disposed on the top surface, bottom surface, or both, of the adhesive layer.

The adhesive layer 40 may comprise one or more selected from the group consisting of bitumen, thermoplastic resin, rubber-based resin, acrylic resin, phenol resin, and urea resin. Preferably, an adhesive material based on soft bitumen or thermoplastic resin, nitrile rubber or acrylic resin is applied to one or both surfaces of the reinforcement fiber layer. If thermosetting resin such as hard epoxy resin or urethane resin is used, it will be difficult to prepare and apply the film. The adhesive layer may be applied to one or both surfaces of the reinforcement fiber layer. The thickness of the adhesive layer may be 0.1-5 mm.

The reinforcement fiber layer 30 may be a woven fabric, nonwoven fabric or grid-type network made of one or two fibers selected from carbon fiber, glass fiber, aramid fiber and polyester fiber. The reinforcement fiber layer may include holes in order to ensure the adhesion between a substrate and a newly installed asphalt layer. The holes may be produced by the specificity of a shape or a post-treatment process such as a needle punch process. The size of the holes is not limited, but the diameter of the holes may be 3 mm to 100 mm, preferably 10 mm to 50 mm.

In addition, in the asphalt reinforcement according to the present invention, the reinforcement fiber layer and the film layer may be integrated with each other by heating the reinforcement fiber layer or the film layer.

Specifically, the asphalt reinforcement may be prepared by heating the reinforcement fiber layer or the film layer to a temperature of 80-110° C., and then integrating the film layer with the reinforcement fiber layer. Namely, the asphalt reinforcement may be prepared without having to use a separate adhesive layer. Herein, the average weight of the film layer may be 9-150 gsm (g/m$^2$), preferably 10-100 gsm (g/m$^2$).

FIG. 2 is an exploded perspective view showing a state in which an asphalt reinforcement comprising an air-permeable polyethylene film according to the present invention is attached to an asphalt, concrete or steel substrate 10. A method of attaching the asphalt reinforcement is as follows. An existing asphalt substrate, cut or milled asphalt substrate, concrete substrate or steel substrate 10 is cleaned. In order to enhance the adhesion between the existing substrate and a newly installed asphalt pavement layer, a tack coat 20 is applied to the existing substrate using a device, and then the asphalt reinforcement 100 having the air-permeable polyethylene film attached thereto is installed on the tack coat. Finally, new asphalt 60 is paved on the film.

FIG. 3 is an exploded perspective view showing in a state in which an air-permeable polyethylene film is attached to the top surface of a tack coat and the top surface of an asphalt reinforcement. A method of attaching the asphalt reinforcement is as follows. An existing asphalt substrate, cut or milled asphalt substrate, concrete substrate or steel substrate 10 is cleaned. Then, a tack coat 20 is applied to the substrate using a device in order to enhance the adhesion between the existing substrate and a newly installed asphalt pavement layer, and then an air-permeable polyethylene film 50 is attached thereto. Next, the asphalt reinforcement 100 is installed on the film. Finally, new asphalt 60 is paved on the asphalt reinforcement.

FIGS. 4 and 5 are a flow chart and a process diagram, respectively, which show a process of repairing a concrete joint using an air-permeable polyethylene film. Specifically, a concrete pavement to be repaired is cleaned (S11 in FIG.

5(a)). Tack coating is performed in order to ensure the adhesion between the concrete substrate and an asphalt layer (S12 in FIG. 5(b)), and then a film is attached to the tack coat layer (S13 in FIG. 5(c)). Next, an asphalt reinforcement may be attached to each joint on the film in order to prevent reflection cracking of the joint. At this time, a portion of the underlying film (10-100 cm width) may be melted by heating in order to facilitate the adhesion of the reinforcement to the joint (S14 in FIG. 5(d)). An asphalt reinforcement is attached to the joint (S15 in FIG. 5(e)), and new asphalt is installed (S16 in FIG. 5(f)).

Hereinafter, the present invention will be described in further detail with reference to examples. It is to be understood, however, that the scope of the present invention is not limited to these examples.

In the following examples, physical properties were measured in the following manner.

1) Tensile Strength (g/25 mm)

Using an universal testing machin from Instron corporation, a film sample having a width of 25 mm and a length of 100 mm was tested at a elongation speed of 508 mm/min. The strength at breakage was measured in the machine direction (MD) and the transverse direction (TD).

2) Elongation (%)

Using an testing machin from Instron corporation, a film sample having a width of 25 mm and a length of 100 mm was tested at a elongation speed of 508 mm/min. The elongation at breakage was measured in the machine direction (MD) and the transverse direction (TD).

3) Flexibility

Flexibility was evaluated by feeling based on the following criteria: A=very smooth and flexible, B=flexible and smooth, and C=hard and rough.

4) Melting Temperature

A film sample was placed on a temperature-controllable heating plate and the melting temperature thereof was measured.

Examples 1 to 3

As low-density polyethylene (hereinafter referred to as LDPE), Grade 955 (Hanwha Chemical Corp.) having a melt index of 7.7 g/10 min (190° C., 2.16 kg) and a density of 0.919 g/cm$^3$ was used.

As linear low-density polyethylene (hereinafter referred to as LLDPE), FT-850 (SK Global Chemical Co., Ltd.) having a melt index of 3.0 g/10 min (190° C., 2.16 kg) and a density of 0.919 g/cm$^3$ was used.

As high-density polyethylene (hereinafter referred to as HDPE), ME 8000 (LG Chemical Co., Ltd.) having a melt index of 8.0 g/10 min (190° C., 2.16 kg) and a density of 0.957 g/cm$^3$ was used.

As an inorganic material, calcium carbonate (YK-1C, Yabashi Korea Co., Ltd.) having an average particle size of 1.8 μm was used.

As shown in Table 1 below, polyethylene compositions having various contents of components were melted in a T-die extruder at 250° C., thereby preparing films. The properties of the prepared films were measured, and the results of the measurement are shown in Table 1 below.

Example 4

As shown in Table 1 below, a film was prepared in the same manner using the same components as described in Examples 1 to 3, except that the contents of the components were changed. A color master batch (hereinafter referred to as C-M/B) was prepared by compounding 60 wt % of a pigment with 40 wt % of low-density polyethylene (LDPE) as a base material. The results are shown in Table 1 below.

Comparative Examples 1 and 2

As shown in Table 1 below, a film was prepared in the same manner using the same components as described in Examples 1 to 4, except that the contents of the components were changed.

Comparative Example 3

As shown in Table 1 below, the physical properties and characteristics of a commercially available protective OPP film for an asphalt reinforcement were measured.

TABLE 1

| | Example 1 | Example 2 | Example 3 | Example 4 | Comp. Example 1 | Comp. Example 2 | (wt %) Comp. Example 3 |
|---|---|---|---|---|---|---|---|
| LDPE-1 | 10 | 5 | 7 | 8 | 3 | 10 | OPP film |
| LLDPE-1 | 40 | 47 | 38 | 35 | 27 | 40 | |
| HDPE-1 | 10 | 3 | 5 | 7 | 5 | 30 | |
| Calcium carbonate | 40 | 45 | 50 | 40 | 35 | 20 | |
| Color master batch | — | — | — | 10 | 30 | | |
| Sum | 100 | 100 | 100 | 100 | 100 | 100 | — |
| Average weight | 15 | 20 | 15 | 13 | 15 | 13 | 12 |
| Tensile strength (g/25 mm) MD | 1100 | 1200 | 900 | 900 | 550 | 1000 | 1700 |
| Tensile strength (g/25 mm) TD | 350 | 350 | 250 | 250 | 200 | 300 | 600 |
| Elongation (%) MD | 200 | 250 | 150 | 250 | 200 | 100 | 13 |
| Elongation (%) TD | 150 | 200 | 150 | 200 | 250 | 100 | 5 |
| Moisture permeability (air permeability) (g/m$^2$ day) | 3000 | 3500 | 4000 | 3500 | 1000 | 500 | 0 |
| Flexibility | A | A | A | A | A | B | C |
| Melting temperature | 115 | 105 | 110 | 110 | 110 | 125 | 160 |

As can be seen in Table 1 above, the films prepared in the Examples of the present invention showed tensile strengths comparable to those of products and also showed high elongation and moisture permeability. In addition, the films of the present invention showed excellent permeability and had a low melting temperature, indicating that these films can be easily used in road construction work without requiring a separate heating device.

The film of Comparative Example 1 showed a tensile strength lower than those of the Examples, indicating that it is deformed in road construction work. In addition, the film of Comparative Example 2 showed low air permeability, indicating that the discharge of water or steam through the film in actual use is low, and thus the application of the film is not easy. Furthermore, the film of Comparative Example 2 had a high melting temperature, indicating that it requires a separate heating device.

DESCRIPTION OF REFERENCE NUMERALS USED IN THE DRAWINGS

10: asphalt substrate, concrete substrate or steel substrate;
20: tack coat layer;
30: reinforcement fiber layer;
40: adhesive layer;
50: air-permeable polyethylene film layer;
60: newly installed asphalt;
100: asphalt reinforcement.

The invention claimed is:

1. An asphalt reinforcement comprising:
a reinforcement fiber layer having a plurality of holes formed therein; and
an air-permeable polyethylene film layer disposed on a top surface, bottom surface, or both, of the reinforcement fiber layer;
wherein the air-permeable polyethylene film layer is prepared from a polyethylene composition comprising, based on the total weight of the air-permeable polyethylene film layer, 4-20 wt % of low-density polyethylene, 10-45 wt % of linear low-density polyethylene, 1-25 wt % of high-density polyethylene, and 30-70 wt % of an inorganic material;
an air permeability in a thickness direction of the air-permeable polyethylene film layer is 1,100 g/m²·day to 5,000 g/m²·day;
a melting temperature of the air-permeable polyethylene film layer is 105 to 115° C.; and
the asphalt reinforcement is attached to a tack coat and is used for road pavement.

2. The asphalt reinforcement of claim 1, wherein the reinforcement fiber layer and the air-permeable polyethylene film layer of the asphalt reinforcement are integrated with each other by heating the reinforcement fiber layer or the air-permeable polyethylene film layer.

3. The asphalt reinforcement of claim 1, further comprising an adhesive layer between the reinforcement fiber layer and the air-permeable polyethylene film layer.

4. The asphalt reinforcement of claim 1, wherein the low-density polyethylene of the air-permeable polyethylene film layer has a melt index of 0.1-10.0 g/10 min (190° C., 2.16 kg) and a density of 0.910-0.930 g/cm³, and the linear low-density polyethylene has a melt index of 1.0-7.0 g/10 min (190° C., 2.16 kg) and a density of 0.915-0.940 g/cm³, and the high-density polyethylene has a melt index of 1.0-10.0 g/10 min (190° C., 2.16 kg) and a density of 0.940-0.965 g/cm³.

5. The asphalt reinforcement of claim 1, wherein the inorganic material of the air-permeable polyethylene film layer is one or more selected from the group consisting of calcium carbonate, magnesium carbonate, magnesium sulfate, barium sulfate, talc, kaolin, zinc oxide, titanium dioxide, alumina, aluminum hydroxide, magnesium hydroxide, zeolite, diatomaceous earth, and clay, and the inorganic material has an average particle size of 1.1-4.0 μm.

6. The asphalt reinforcement of claim 1, wherein the air-permeable polyethylene film layer further comprises one or more additives selected from the group consisting of an antioxidant agent, an anti-blocking agent, a UV stabilizer and a slip agent.

7. The asphalt reinforcement of claim 1, wherein the air-permeable polyethylene film layer has irregularities on one or both surfaces thereof.

8. The asphalt reinforcement of claim 1, wherein the air-permeable polyethylene film layer has an average weight of 9-150 g/m².

* * * * *